United States Patent
Sakurada et al.

(10) Patent No.: US 11,983,021 B2
(45) Date of Patent: May 14, 2024

(54) CONTROLLER, SYSTEM, FLYING OBJECT, AND TRANSPORT METHOD

(71) Applicant: TOYOTA JIDOSHA KABUSHIKI KAISHA, Toyota (JP)

(72) Inventors: Shin Sakurada, Toyota (JP); Kazuya Nishimura, Anjo (JP); Soutaro Kaneko, Nagoya (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 80 days.

(21) Appl. No.: 17/462,471

(22) Filed: Aug. 31, 2021

(65) Prior Publication Data

US 2022/0107657 A1 Apr. 7, 2022

(30) Foreign Application Priority Data

Oct. 2, 2020 (JP) ................................. 2020-168023

(51) Int. Cl.
*G05D 1/00* (2024.01)

(52) U.S. Cl.
CPC ............. *G05D 1/106* (2019.05); *G05D 1/102* (2013.01)

(58) Field of Classification Search
CPC ...... G05D 1/106; G05D 1/102; G05D 1/0055; G05D 1/101
See application file for complete search history.

(56) References Cited

U.S. PATENT DOCUMENTS

| | | | |
|---|---|---|---|
| 9,896,207 B2 * | 2/2018 | Natarajan | G01S 5/14 |
| 9,914,539 B1 * | 3/2018 | Bar-Zeev | B64C 27/006 |
| 10,553,122 B1 * | 2/2020 | Gilboa-Amir | G08G 5/0056 |
| 2016/0275801 A1 * | 9/2016 | Kopardekar | G08G 5/0026 |
| 2017/0011333 A1 * | 1/2017 | Greiner | G06K 7/10722 |
| 2017/0213308 A1 * | 7/2017 | Wellborn | G06Q 50/30 |
| 2019/0250643 A1 | 8/2019 | Takizawa | |
| 2019/0392716 A1 * | 12/2019 | Lu | G08G 5/0039 |
| 2020/0033132 A1 | 1/2020 | Inoshita | |
| 2021/0056859 A1 | 2/2021 | Tachiiwa | |

FOREIGN PATENT DOCUMENTS

| | | | | |
|---|---|---|---|---|
| CN | 106184753 A | * | 12/2016 | ........... B64C 39/024 |
| CN | 107764255 A | * | 3/2018 | |
| EP | 2813914 A1 | * | 12/2014 | ............. G05D 1/101 |
| ES | 2708904 A1 | * | 4/2019 | ............. G06Q 50/28 |
| JP | 2013-170050 A | | 9/2013 | |
| JP | 2018-203056 A | | 12/2018 | |
| JP | 2019-164003 A | | 9/2019 | |
| JP | 2019-175166 A | | 10/2019 | |

(Continued)

OTHER PUBLICATIONS

English Translation for KR-101848236-B1 (Year: 2018).*
English Translation for EP-2813914-A1 (Year: 2014).*
English Translation for WO-2018179404-A1 (Year: 2018).*

*Primary Examiner* — Rachid Bendidi
*Assistant Examiner* — Moises Gasca Alva
(74) *Attorney, Agent, or Firm* — Dinsmore & Shohl LLP (57) ABSTRACT

A controller includes a control unit. The control unit is configured to detect a state of at least one point, and determine depending on the detected state whether or not to include, in a flight route of a flying object transporting a package, a position above the at least one point as a passing point for the flying object to pass.

14 Claims, 6 Drawing Sheets

(56) References Cited

FOREIGN PATENT DOCUMENTS

| JP | 2020-087134 A | | 6/2020 | | |
|---|---|---|---|---|---|
| KR | 101848236 B1 | * | 5/2018 | | |
| WO | 2017/216972 A1 | | 12/2017 | | |
| WO | 2018/179404 A1 | | 10/2018 | | |
| WO | WO-2018179404 A1 | * | 10/2018 | ........... | B64C 39/024 |
| WO | WO-2019225313 A1 | * | 11/2019 | ........... | A01K 29/005 |

* cited by examiner

CONTROLLER, SYSTEM, FLYING OBJECT, AND TRANSPORT METHOD

CROSS-REFERENCE TO RELATED APPLICATION

This application claims priority to Japanese Patent Application No. 2020-168023 filed on Oct. 2, 2020, incorporated herein by reference in its entirety.

BACKGROUND

1. Technical Field

The present disclosure relates to a controller, a system, a flying object, and a transport method.

2. Description of Related Art

Japanese Unexamined Patent Application Publication No. 2018-203056 discloses a drone that enters a veranda and collects a package from a storage device provided on the veranda.

SUMMARY

It is necessary to give an enhanced sense of safety to residents in areas related to the flight of drones flying overhead.

An object of the present disclosure is to reduce the probability of an accident occurring due to a package being dropped during transport by a flying object.

A controller according to the present disclosure includes a control unit. The control unit is configured to detect a state of at least one point and determine depending on the detected state whether or not to include, in a flight route of the flying object transporting a package, a position above the at least one point as a passing point for the flying object to pass.

A flying object according to the present disclosure is a flying object that transports a package. The flying object includes a communication unit, and a control unit. The communication unit is configured to receive route data indicating a flight route from a controller, the controller being configured to determine depending on a state of at least one point whether or not to include in the flight route of the flying object a position above the at least one point as a passing point for a flying object to pass. The control unit is configured to control flight of the flying object based on the route data received by the communicating unit.

A transport method according to the present disclosure includes: detecting a state of at least one point by a controller; determining depending on the detected state whether or not to include in a flight route of a flying object a position above the at least one point as a passing point for the flying object to pass by the controller; and transporting a package along the flight route by the flying object.

According to the present disclosure, it is possible to reduce the probability of an accident occurring due to a package being dropped during transport by the flying object.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings.

In the drawings, identical or corresponding component members are designated by identical reference signs. In the description of the present embodiment, description of the identical or corresponding component members are omitted or simplified as appropriate.

Figure 1:
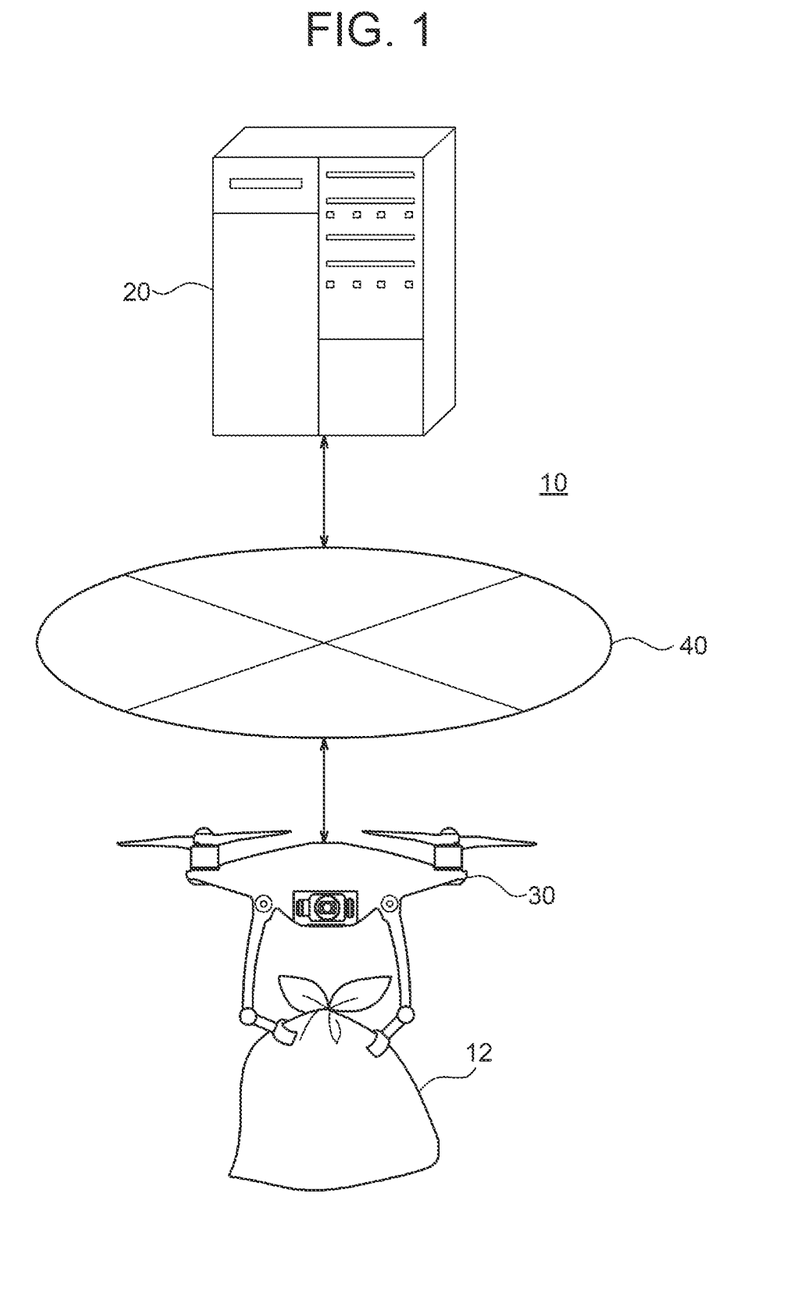
FIG. 1 shows the configuration of a system according to an embodiment of the present disclosure.

With reference to FIG. 1, the configuration of a system 10 according to the present embodiment will be described.

The system 10 includes at least one controller 20, and at least one flying object 30. The controller 20 is communicable with the flying object 30 via a network 40.

The controller 20 is installed in facilities such as data centers. The controller 20 is a computer such as a server belonging to a cloud computing system or other computing systems.

The flying object 30 is a UAV such as an autonomous flight drone. The abbreviation "UAV" stands for unmanned aerial vehicle. The flying object 30 flies by autonomous operation in the present embodiment. However, the flying object 30 may fly by remote control.

The network 40 includes the Internet, at least one WAN, at least one MAN, or any combination of these. The abbreviation "WAN" stands for wide area network. The abbreviation "MAN" stands for metropolitan area network. The network 40 includes at least one wireless network, at least one optical network, or any combination of these. Examples of the wireless network include ad-hoc networks, cellular networks, wireless LANs, satellite communication networks, or ground microwave networks. The abbreviation "LAN" stands for local area network.

Figure 2:
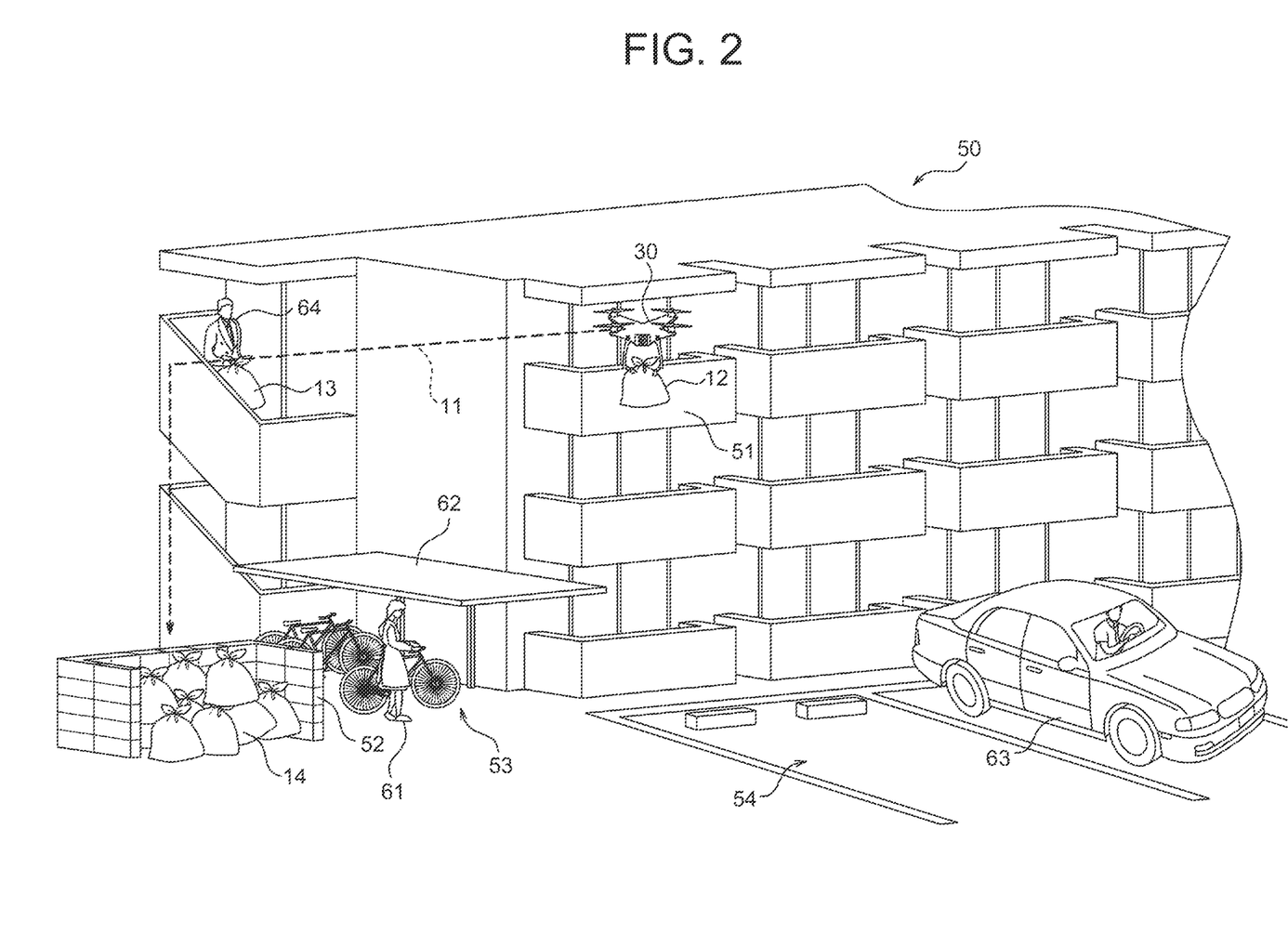
FIG. 2 shows an example of a flight route of a flying object according to the embodiment of the present disclosure.

With reference to FIGS. 1 and 2, the outline of the present embodiment will be described.

The controller 20 detects the state of at least one point. The controller 20 determines depending on the detected state whether or not to include in a flight route 11 of the flying object 30 the position above the at least one point as a passing point for the flying object 30 to pass. The flying object 30 flies along the flight route 11 to transport a package 12.

According to the present embodiment, it is possible to determine the flight route 11 in consideration of the state of the ground. Therefore, it is possible to reduce the probability of an accident occurring due to the package 12 being dropped during transport by the flying object 30. As a result, it is expected to give an enhanced sense of safety to residents in areas related to the flight of the flying object 30.

In the example of FIG. 2, the flying object 30 is a drone that generates lift by rotating a plurality of rotor blades. The number of the rotor blades, which may be any number, is four in this example. The package 12, which may be any article transportable by the drone, is garbage in this example. Before transportation, the package 12 may be placed in any location accessible by the drone. In this example, the package 12 is placed in a veranda 51 of an apartment 50. A transport destination of the package 12 may be a garbage collection vehicle. In this example, the transport destination is a garbage collection place, that is, a collection station 52 in the vicinity of the apartment 50 to be specific. The controller 20 performs flight routing when the flying object 30 transports the package 12 from the veranda 51. Specifically, the controller 20 determines a flight route 11 that is instructed to the flying object 30 when the flying object 30 transports the package 12 to the collection station 52.

In the present embodiment, "the state of the at least one point" includes whether or not any person is present at the at least one point. In the example of FIG. 2, the flight routing is performed in consideration of whether or not any person is present at each point such as a bicycle parking place 53 of the apartment 50 or parking space in a parking place 54 of the apartment 50. Therefore, it is possible to reduce the probability of an accident occurring due to the package 12 being dropped and hitting a person during transport by the flying object 30.

In the present embodiment, "the state of the at least one point" further includes whether or not any vehicle is present at the at least one point. In the example of FIG. 2, the flight routing is performed in consideration of whether or not any vehicle is present at each point such as the bicycle parking place 53 or the parking space in the parking place 54. Therefore, it is possible to reduce the probability of an accident occurring due to the package 12 being dropped and hitting a vehicle during transport by the flying object 30.

In the present embodiment, "the state of the at least one point" further includes whether or not any shielding object that shields the ground is present at the at least one point. In the example of FIG. 2, the flight routing is performed in consideration of whether or not any shielding object is present at each point such as the bicycle parking place 53 or the parking space in the parking place 54. Specifically, the controller 20 determines the flight route 11 such that the flying object 30 flies above the point where no person or each vehicle is present or where any shielding object is present. In other words, the controller 20 determines the flight route 11 such that the flying object 30 does not fly above the point where any person or any vehicle is present and where no shielding object is present. Therefore, it is possible to reduce the probability of an accident occurring due to the package 12 being dropped and hitting a person or vehicle during transport by the flying object 30.

Figure 3:
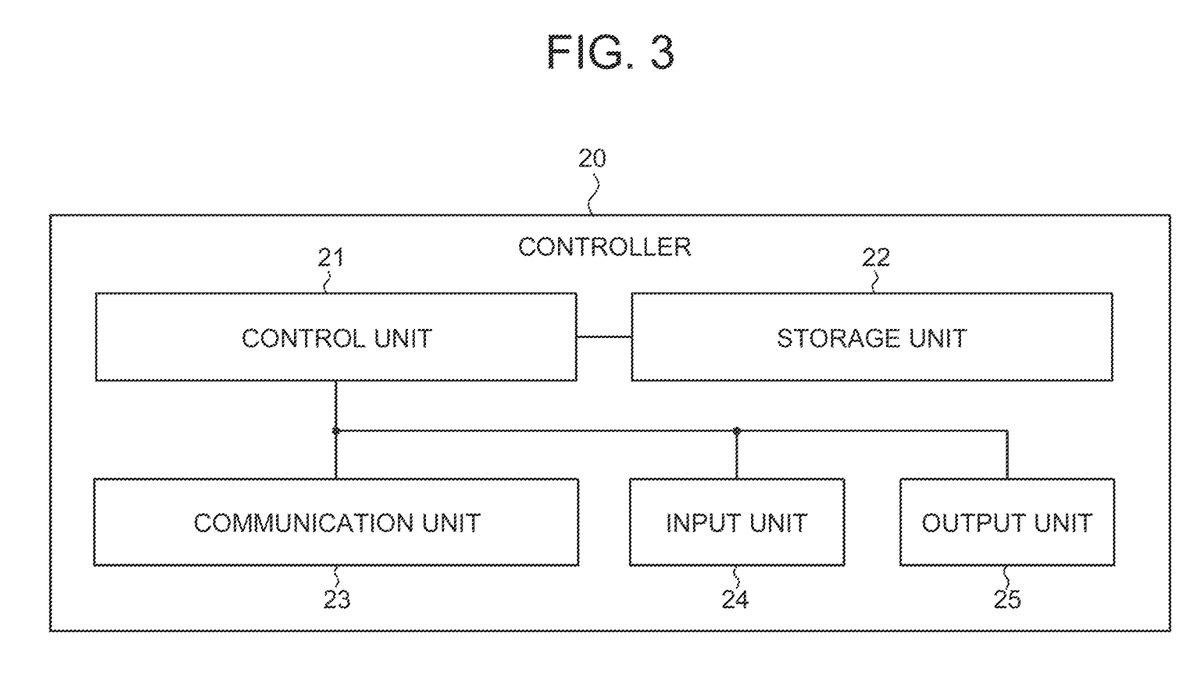
FIG. 3 is a block diagram showing the configuration of a controller according to the embodiment of the present disclosure.

With reference to FIG. 3, the configuration of the controller 20 according to the present embodiment will be described.

The controller 20 includes a control unit 21, a storage unit 22, a communication unit 23, an input unit 24, and an output unit 25.

The control unit 21 includes at least one processor, at least one programmable circuit, at least one dedicated circuit, or any combination of these. The processor is a general-purpose processor such as a CPU or a GPU, or a specialized processor specialized in specific processing. The abbreviation "CPU" stands for central processing unit. The abbreviation "GPU" stands for graphics processing unit. The programmable circuit is, for example, an FPGA. The abbreviation "FPGA" stands for field-programmable gate array. The dedicated circuit is, for example, an ASIC. The abbreviation "ASIC" stands for application specific integrated circuit. The control unit 21 executes processing related to operation of the controller 20, while controlling each unit of the controller 20.

The storage unit 22 includes at least one semiconductor memory, at least one magnetic memory, at least one optical memory, or any combination of these. The semiconductor memory is, for example, a RAM or a ROM. The abbreviation "RAM" stands for random access memory. The abbreviation "ROM" stands for read only memory. The RAM is, for example, an SRAM or a DRAM. The abbreviation "SRAM" stands for static random access memory. The abbreviation "DRAM" stands for dynamic random access memory. The ROM is, for example, an EEPROM. The abbreviation "EEPROM" stands for electrically erasable programmable read only memory. The storage unit 22 may function as, for example, a main storage, an auxiliary storage, or a cache memory, 22. The storage unit 22 stores data used for operation of the controller 20, and data obtained by operation of the controller 20.

The communication unit 23 may include at least one communication interface. The communication interface is, for example, a LAN interface. The communication unit 23 receives data used for operation of the controller 20, and transmits data obtained by operation of the controller 20.

The input unit 24 includes at least one input interface. The input interface is, for example, a physical key, an electro-static capacitance key, a pointing device, a touchscreen integrally provided with a display, a camera, or a microphone. The input unit 24 accepts operation of inputting data used for operation of the controller 20. The input unit 24 may be connected to the controller 20 as an external input device instead of being provided in the controller 20. As a connection system, any system may be used such as a USB system, an HDMI (registered trademark) system, or a Bluetooth (registered trademark) system. The abbreviation "USB" stands for universal serial bus. The abbreviation "HDMI (registered trademark)" stands for high-definition multimedia interface.

The output unit 25 includes at least one output interface. The output interface is, for example, a display, or a speaker. The display is, for example, an LCD or an organic EL display. The abbreviation "LCD" stands for liquid crystal display. The abbreviation "EL" stands for electro luminescence. The output unit 25 outputs data obtained by operation of the controller 20. The output unit 25 may be connected to the controller 20 as an external output device instead of being provided in the controller 20. As a connection system, optional systems may be used such as a USB system, an HDMI (registered trademark) system, or a Bluetooth (registered trademark) system.

The functions of the controller 20 are implemented by executing a first control program according to the present embodiment by a processor serving as the control unit 21. Specifically, the functions of the controller 20 are implemented by software. The first control program causes a computer to function as the controller 20 by causing the computer to execute the operation of the controller 20. Specifically, the computer can function as the controller 20 by executing the operation of the controller 20 in accordance with the first control program.

The program can be stored in a non-transitory computer readable recording medium. For example, the non-transitory computer readable recording medium is a flash memory, a magnetic recording medium, an optical disk, an optical magnetic recording medium, or a ROM. For example, the program may be distributed by selling, transferring or lending a portable medium, such as an SD card, a DVD, or a CD-ROM, having the program recorded therein. The abbreviation "SD" stands for secure digital. The abbreviation "DVD" stands for digital versatile disc. The abbreviation "CD-ROM" stands for compact disc read only memory. The program can be distributed by storing the program on the storage of a server, and transferring the program from the server to other computers. The program may be provided as a program product.

The computer can temporarily store in its main storage the program recorded in a portable medium or the program transferred from the server, for example. Then, the computer reads the program stored in the main storage by a processor, and executes processing in accordance with the read program by the processor. The computer may also read the program directly from the portable medium, and may execute the processing in accordance with the program. Whenever the program is transferred to the computer from the server, the computer may execute the processing in accordance with the received program in sequence. The computer may also execute the processing by what is called an ASP service which implements the functions only through instructing execution and acquiring a result, without through transfer of the program from the server to the computer. The abbreviation "ASP" stands for application service provider. The program may include those equivalent to the program which is information used for processing by an electronic calculator. For example, the data which does not constitute direct instructions to the computer although having the property of defining the processing of the computer corresponds to "those equivalent to the program".

Some or all of the functions of the controller 20 may be implemented by a programmable circuit or a dedicated circuit serving as the control unit 21. Specifically, some or all of the functions of the controller 20 may be implemented by hardware.

Figure 4:
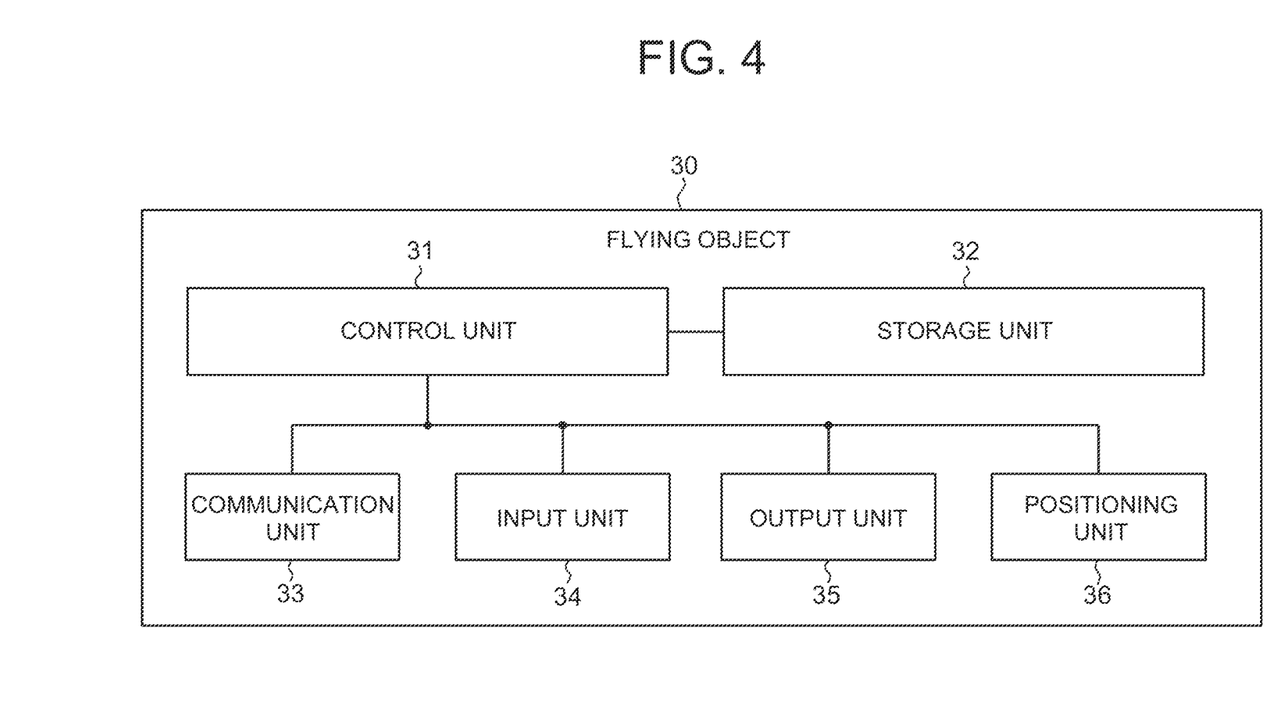
FIG. 4 is a block diagram showing the configuration of the flying object according to the embodiment of the present disclosure.

With reference to FIG. 4, the configuration of the flying object 30 according to the present embodiment will be described.

The flying object 30 includes a control unit 31, a storage unit 32, a communication unit 33, an input unit 34, an output unit 35, and a positioning unit 36.

The control unit 31 includes at least one processor, at least one programmable circuit, at least one dedicated circuit, or any combination of these. The processor is a general-purpose processor such as a CPU or a GPU, or a specialized processor specialized in specific processing. The programmable circuit is, for example, an FPGA. The dedicated circuit is, for example, an ASIC. The control unit 31 executes processing related to operation of the flying object 30, while controlling each unit of the flying object 30.

The storage unit 32 includes at least one semiconductor memory, at least one magnetic memory, at least one optical memory, or any combination of these. The semiconductor memory is, for example, a RAM or a ROM. The RAM is, for example, an SRAM or a DRAM. The ROM is, for example, an EEPROM. For example, the storage unit 32 may function as a main storage, an auxiliary storage, or a cache memory. The storage unit 32 receives data used for operation of the flying object 30, and transmits data obtained by operation of the flying object 30.

The communication unit 33 may include at least one communication interface. Examples of the communication interface include interfaces supporting mobile communications standards, such as LTE, 4G standards, or 5G standards, interfaces supporting short-range wireless communications such as Bluetooth (registered trademark), or LAN interfaces. The abbreviation "LTE" stands for long term evolution. The abbreviation "4G" stands for 4th generation. The abbreviation "5G" stands for 5th generation. The communication unit 33 receives data used for operation of the flying object 30, and transmits data obtained by operation of the flying object 30.

The input unit 34 includes at least one input interface. The input interface is, for example, a physical key, an electrostatic capacitance key, a pointing device, a touchscreen integrally provided with a display, a camera, or a microphone. The input unit 34 accepts operation of inputting data used for operation of the flying object 30. The input unit 34 may be connected to the flying object 30 as an external input device instead of being provided in the flying object 30. As a connection system, optional systems may be used such as a USB system, an HDMI (registered trademark) system, or a Bluetooth (registered trademark) system.

The output unit 35 includes at least one output interface. The output interface is, for example, a display, or a speaker. The display is, for example, an LCD or an organic EL display. The output unit 35 outputs data obtained by operation of the flying object 30. The output unit 35 may be connected to the flying object 30 as an external output device instead of being provided in the flying object 30. As a connection system, optional systems may be used such as a USB system, an HDMI (registered trademark) system, or a Bluetooth (registered trademark) system.

The positioning unit 36 includes at least one GNSS receiver. The abbreviation "GNSS" stands for global navigation satellite system. The GNSS may be, for example, a GPS, a QZSS, a BDS, a GLONASS or a Galileo. The abbreviation "GPS" stands for global positioning system. The abbreviation "QZSS" stands for quasi-zenith satellite system. QZSS satellites are referred to as quasi-zenith satellites. The abbreviation "BDS" stands for BeiDou navigation satellite system. The abbreviation "GLONASS" stands for global navigation satellite system. The positioning unit 36 measures the position of the flying object 30.

The control unit 31, the storage unit 32, the communication unit 33, the input unit 34, the output unit 35, and the positioning unit 36 may be provided so as to be built into the flying object 30 individually, or may be built into at least one control device and the control device is provided in the flying object 30.

The functions of the control device are implemented by executing a second control program according to the present embodiment by a processor serving as the control unit 31. Specifically, the functions of the control device are implemented by software. The second control program causes the computer to function as the control device by causing the computer to execute the operation of the control device. Specifically, the computer can function as the control device by executing the operation of the control device in accordance with the second control program.

Some or all of the functions of the control device may be implemented by a programmable circuit or a dedicated circuit serving as the control unit 31. Specifically, some or all of the functions of the control device may be implemented by hardware.

Figure 5:
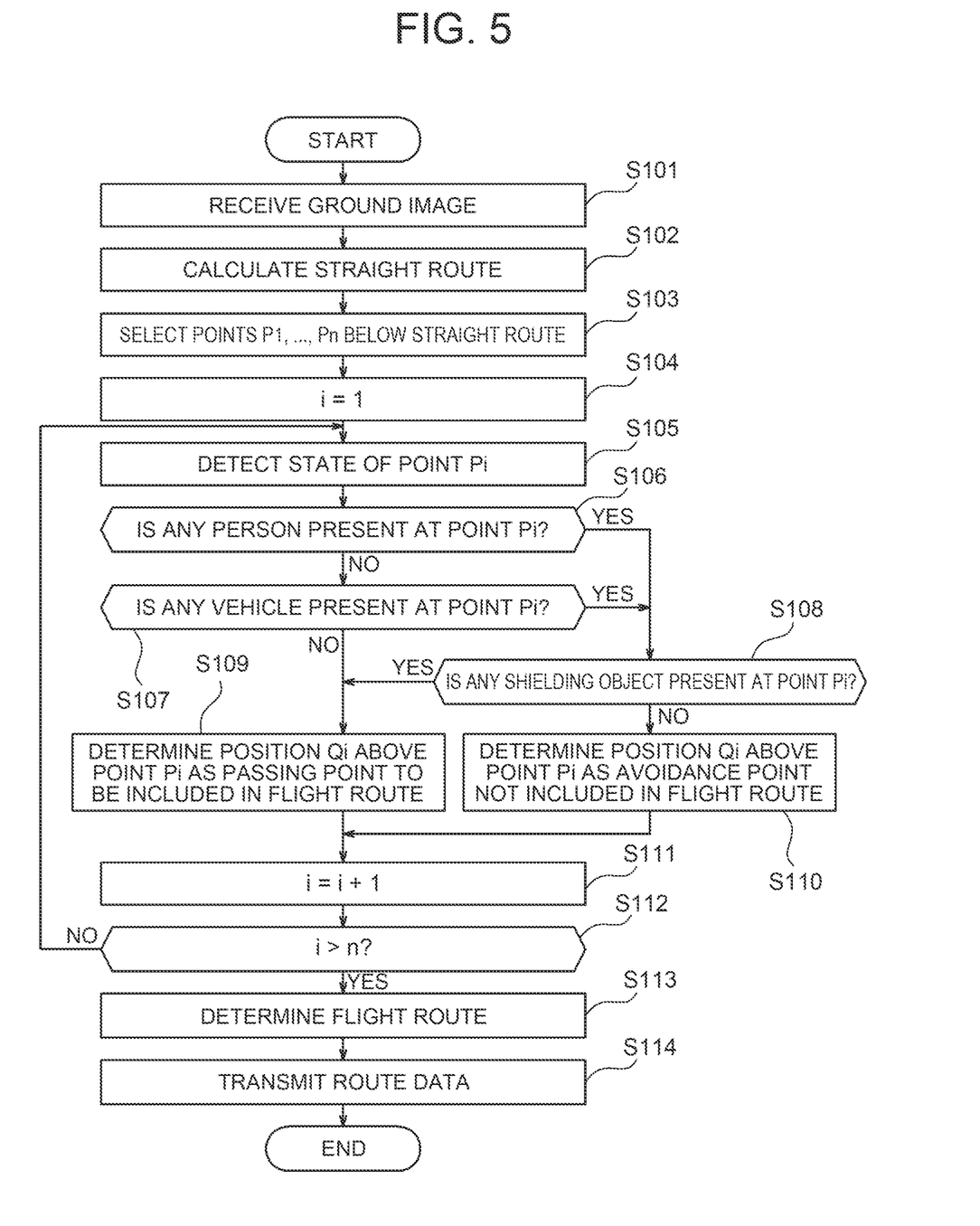
FIG. 5 is a flow chart showing operation of the controller according to the embodiment of the present disclosure.
Figure 6:
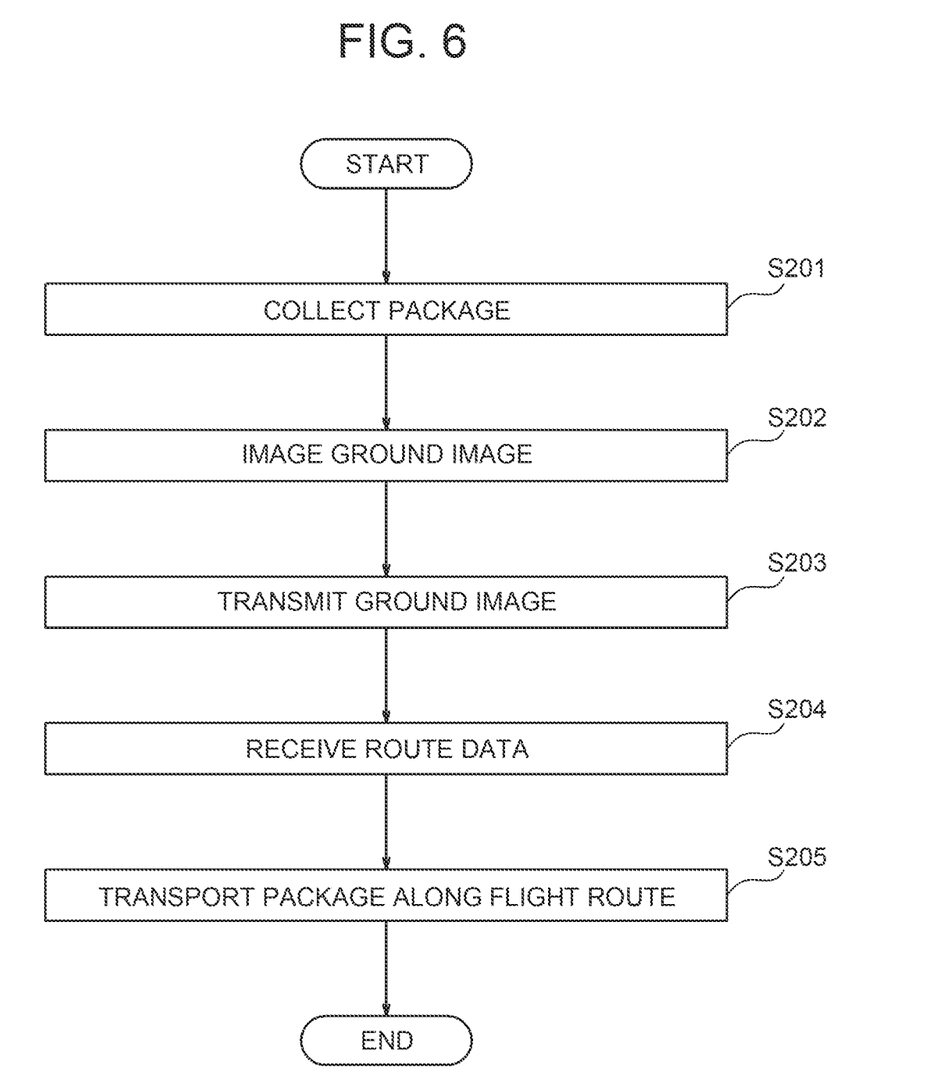
FIG. 6 is a flow chart showing operation of the flying object according to the embodiment of the present disclosure.

With reference to FIGS. 5 and 6, the operation of the system 10 according to the present embodiment will be described. The operation corresponds to a transport method according to the present embodiment. FIG. 5 shows the operation of the controller 20. FIG. 6 shows the operation of the flying object 30.

In step S201 in FIG. 6, the control unit 31 of the flying object 30 flies the flying object 30 to a sender of the package 12. The flying object 30 collects the package 12 from the sender of the package 12. In the example shown in FIG. 2, the flying object 30 collects the package 12 by holding the package 12 using a pair of arms on the veranda 51.

In step S202 in FIG. 6, the flying object 30 images an image of the ground including a transport destination of the package 12. In the example of FIG. 2, the flying object 30 moves to the position where the collection station 52 close to the veranda 51 is visible, and then images an image of the ground in the vicinity of the apartment 50 using a camera as the input unit 34. The image may be a static image or a moving image.

In step S203 in FIG. 6, the control unit 31 of the flying object 30 makes the communication unit 33 transmit the ground image imaged in step S202. The communication unit 33 transmits the ground image to the controller 20.

In step S101 in FIG. 5, the communication unit 23 of the controller 20 receives the ground image transmitted in step S203 in FIG. 6 from the flying object 30. The control unit 21 of the controller 20 acquires the ground image received by the communication unit 23.

In step S102 in FIG. 5, the control unit 21 of the controller 20 analyzes the ground image acquired in step S101, and calculates a straight route to the transport destination of the package 12. Known methods can be used as the image analysis method. Machine learning may also be used. In the example shown in FIG. 2, the control unit 21 analyzes the image of the ground in the vicinity of the apartment 50 imaged from the flying object 30, and calculates a shortest route when the flying object 30 flies horizontally to the collection station 52. As a modification, the control unit 21 may calculate the shortest route by referring to the position data on the flying object 30 and the collection station 52, instead of analyzing the ground image. The position data on the flying object 30 is data indicating the position, such as three-dimensional coordinates, of the flying object 30. Specifically, the position data on the flying object 30 is data indicating the position measured by the positioning unit 36 of the flying object 30. The position data on the flying object 30 may be acquired from the flying object 30 together with the ground image in step S101, or may be acquired from the flying object 30 separately from the ground image in step S102. The position data on the collection station 52 is data indicating the position, such as three-dimensional coordinates, of the collection station 52. The position data on the collection station 52 may be pre-stored in the storage unit 22 of the controller 20, or may be acquired from an external system such as a GIS on the Internet. The abbreviation "GIS" stands for geographic information system.

In step S103 in FIG. 5, the control unit 21 of the controller 20 selects points P1, . . . , Pn below the straight route calculated in step S102. Here, n is an integer of one or greater. More specifically, the control unit 21 selects at least one point. In the example shown in FIG. 2, the control unit 21 selects the bicycle parking place 53 as the point P1. The control unit 21 selects a parking space of the parking place 54 as the point P2.

In step S104 in FIG. 5, i is set to one. Once the processing of step S105 and subsequent steps is executed, i is incremented by one in step S111. In step S112, when i is equal to or less than n, the processing of step S105 and subsequent steps is performed again.

In step S105 in FIG. 5, the control unit 21 of the controller 20 analyzes the ground image acquired in step S101, and detects the state of the point Pi. Known methods can be used as the image analysis method. Machine learning may also be used.

In step S106 in FIG. 5, the control unit 21 of the controller 20 determines whether or not the state where any person is present at point Pi is detected in step S105, i.e. determines whether any person is present at point Pi. When no person is present at the point Pi, the processing of step S107 is performed. When any person is present at the point Pi, the processing of step S108 is performed. When whether or not any person is present at the point Pi is unknown, the processing of step S108 may be performed.

In step S107 in FIG. 5, the control unit 21 of the controller 20 determines whether or not the state where any vehicle is present at the point Pi is detected in step S105, i.e. whether any vehicle is present at the point Pi. When no vehicle is present at the point Pi, the processing of step S109 is performed. When any vehicle is present at the point Pi, the processing of step S108 is performed. When whether or not any vehicle is present at the point Pi is unknown, the processing of step S108 may be performed.

In step S108 in FIG. 5, the control unit 21 of the controller 20 determines whether or not the state where any shielding object is present at the point Pi is detected in step S105, i.e. determines whether any shielding object is present at the point Pi. When any shielding object is present at the point Pi, the processing of step S109 is performed. When no shielding object is present at the point Pi, the processing of step S110 is performed.

In the example shown in FIG. 2, the control unit 21 detects the state of the bicycle parking place 53 as the state of the point P1. In the bicycle parking place 53, a resident 61 is standing, though a roof 62 corresponding to the shielding object is provided. Therefore, in step S106, the control unit 21 determines that a person is present at the point P1. Alternatively, when the resident 61 is not visible because of the roof 62, the control unit 21 determines that whether any person is present at point P1 is unknown. In step S108, the control unit 21 determines that a shielding object is present at the point P1. As a modification, if there is no roof 62 and the bicycle parking place 53 is exposed, the control unit 21 determines that no shielding object is present at the point P1 in step S108.

In the example shown in FIG. 2, the control unit 21 detects the state of a parking space of the parking place 54 as the state of the point P2. In the parking place 54, a vehicle 63 is parked. However, no vehicle is parked and no person is present in the parking space corresponding to the point P2. Therefore, in step S106, the control unit 21 determines that no person is present at the point P2. Then, in step S107, the control unit 21 determines that no vehicle is present at the point P2.

Then, in step S109 in FIG. 5, the control unit 21 of the controller 20 determines to include in the flight route 11 of the flying object 30 a position Qi above the point Pi as a passing point for the flying object 30 to pass. In other words, the control unit 21 determines the position Qi above the point Pi as the passing point to be included in the flight route 11. In the example shown in FIG. 2, the control unit 21 determines the position Q1 above the bicycle parking place 53 and the portion Q2 above the parking space of the parking place 54 as the passing point.

Then, in step S110 in FIG. 5, the control unit 21 of the controller 20 determines not to include the position Qi above the point Pi in the flight route 11. In other words, the control unit 21 determines the position Qi above the point Pi as an avoidance point that is not included in the flight route 11. In the example in FIG. 2, the bicycle parking place 53 is provided with the roof 62. However, when there is no roof 62 and the bicycle parking place 53 is exposed as the modification, the control unit 21 determines the position Q1 above the bicycle parking place 53 as the avoidance point.

In step S112 of FIG. 5, when i is larger than n, the processing of step S113 is performed.

In step S113 in FIG. 5, the control unit 21 of the controller 20 determines the straight route calculated in step S102 as the flight route 11 without change, when the positions Q1, . . . , Qn above the points P1, . . . , Pn are all determined as the passing point in step S109. When, in step S110, the control unit 21 determines a position Qj above a point Pj as the avoidance point, the control unit 21 determines the flight route 11 by changing the straight route calculated in step S102 to a route that avoids the avoidance point. In the example shown in FIG. 2, the control unit 21 determines the shortest route when the flying object 30 flies horizontally to the collection station 52 as the flight route 11 without change. In the modification where there is no roof 62 and the bicycle parking place 53 is exposed, the control unit 21 determines the flight route 11 by changing the shortest route to a route that avoids the position Q1 above the bicycle parking place 53.

In step S114 in FIG. 5, the control unit 21 of the controller 20 makes the communication unit 23 transmit route data. The route data is data indicating the flight route 11 determined in step S113. The communication unit 23 transmits the route data to the flying object 30.

In step S204 in FIG. 6, the communication unit 33 of the flying object 30 receives the route data transmitted in step S114 in FIG. 5 from the controller 20. The control unit 31 of the flying object 30 acquires the route data received by the communication unit 33.

In step S205 in FIG. 6, the control unit 31 of the flying object 30 controls the flight of the flying object 30 based on the route data acquired in step S204. The flying object 30 flies along the flight route 11 indicated by the route data to transport the package 12. In the example of FIG. 2, the control unit 31 controls the flying object 30 to fly horizontally to the collection station 52, and controls the flying object 30 to vertically descend from above the collection station 52. The flying object 30 releases the package 12 by opening the arms in the collection station 52.

As described before, in the present embodiment, the control unit 21 of the controller 20 detects the state of at least one point. The control unit 21 determines depending on the detected state whether or not to include in the flight route 11 of the flying object 30 the position above the at least one point as a passing point for the flying object 30 transporting the package 12 to pass. Specifically, the control unit 21 determines not to include in the flight route 11 the position above the point where any person or vehicle is present and any shielding object is not present. In other words, when the state where any person or any vehicle is present and no shielding object is present is defined as a "first state", and the state of a given point is the first state, the control unit 21 determines not to include the position above the point in the flight route 11. When the state where no person or vehicle is present or the state where any shielding object is present is defined as a "second state", and the state of a given point is the second state, the control unit 21 determines to include the position above the point in the flight route 11.

According to the present embodiment, the flight route 11 of the flying object 30 can be set to the route where no person or vehicle is present below the route or any shielding object is present below the route. Therefore, the flying object 30 can pass through areas with low risks even when the package 12 drops down.

In the example in FIG. 2, when the flying object 30 transports the package 12 to the collection station 52, the flying object 30 is controlled to move horizontally to the collection station 52, and then vertically descend from directly above the collection station 52. As a modification, the flying object 30 may be controlled to move to the collection station 52 with a true shortest distance. Specifically, the flying object 30 may be controlled to move to the collection station 52 diagonally.

In the example shown in FIG. 2, the flying object 30 is controlled to fly within and around the premise of the apartment 50. As a modification, the flying object 30 may be controlled to fly other locations such as factories or ports. In that case, the flight routing may be performed in consideration of whether or not any person such as employees is present at least one point in the factories or ports. Alternatively, the flight routing may be performed in consideration of whether or not any vehicle such as forklifts is present at least one point in the factories or ports. Alternatively, the flight routing may be performed in consideration of whether or not any shielding object such as roofs is present at least one point in the factories or ports.

In the example shown in FIG. 2, the control unit 21 of the controller 20 analyzes an image on the ground in the vicinity of the apartment 50 to detect the state of each point. As a modification, the control unit 21 may detect the state of each point by referring to design data on structures such as the apartment 50.

As a modification of the present embodiment, the control unit 21 of the controller 20 may predict the state of the transport destination of the package 12. The control unit 21 may adjust the flight schedule of the flying object 30 in accordance with the predicted state. The state of the transport destination of the package 12 may include whether or not any person or vehicle is present at the transport destination of the package 12. In the example in FIG. 2, the control unit 21 may predict the presence or absence of any person or vehicle in the vicinity of the collection station 52 before the flying object 30 starts to fly along the flight route 11. The control unit 21 may adjust the flight schedule by, for example, delaying take-off timing so as to prevent the flying object 30 from being positioned directly above the collection station 52 at a time when people or vehicles are likely to come to the vicinity of the station 52.

In the modification, the control unit 21 may detect a sign of movement of any person to the transport destination of the package 12, and predict the state of the transport destination of the package 12. In the example in FIG. 2, in the case where the resident 64 goes out with a package 13 that is garbage or the like, the control unit 21 may predict that the resident 64 may come to the vicinity of the collection station 52. Alternatively, the control unit 21 may predict the state of the transport destination of the package 12 based on an operation schedule of a collection vehicle that collects articles from the transport destination of the package 12. In the example shown in FIG. 2, when a garbage collection vehicle collects garbage 14 and the like from the collection station 52 at predetermined time, the control unit 21 may predict that the garbage collection vehicle comes to the vicinity of the collection station 52. Alternatively, the control unit 21 may predict the state of the transport destination of the package 12 in accordance with the position of a vehicle heading for the transport destination of the package 12. In the example in FIG. 2, in the case where the vehicle 63 starts to come close to the collection station 52, the control unit 21 may predict that the vehicle 63 comes to the vicinity of the collection station 52.

As another modification of the present embodiment, when the flying object 30 flies along the flight route 11, the control unit 21 of the controller 20 may detect as the state of at least one point the state of a point below a remaining route of the flight route 11. In that case, the control unit 21 determines depending on the detected state whether or not to include in the flight route 11 the position above the at least one point. When the control unit 21 determines the position above a given point as an avoidance point that is not included in the flight route 11, the control unit 21 corrects the flight route 11 by changing the remaining route to a route that avoids the avoidance point. In the example shown in FIG. 2, when the resident 61 moves to an unshielded point P3 between the bicycle parking place 53 and the collection station 52 at the time when the flying object 30 passes the position Q1 above the bicycle parking place 53, the control unit 21 may correct the flight route 11 so as to avoid the position Q3 above the point P3.

As still another modification of the present embodiment, when the state of a point below the remaining route of the flight route 11 changes to the first state while the flying object 30 flies along the flight route 11, the control unit 21 of the controller 20 may make the flying object 30 wait until the state of the point below the remaining route changes to the second state. In the example shown in FIG. 2, in the case where the unshielded point P3 between the bicycle parking place 53 and the collection station 52 is also determined as the passing point, and the resident 61 moves to the point P3 at the time when the flying object 30 passes the position Q1 above the bicycle parking place 53, the control unit 21 may make the flying object 30 wait at the position Q1 above the bicycle parking place 53 until the resident 61 is out of the point P3.

In the example in FIG. 2, the control unit 21 of the controller 20 may not descend the flying object 30 when any person or vehicle comes to the vicinity of the collection station 52 while the flying object 30 files along the flight route 11. The control unit 21 may descend the flying object 30 after the person or vehicle is out of the collection station 52. Until the person or vehicle is out of the collection station 52, the control unit 21 may horizontally move the flying object 30 to the position where no person or vehicle is present below.

As yet another modification of the present embodiment, the control unit 21 of the controller 20 may detect the state of another point Pk in the ground image imaged from the flying object 30, in addition to the state of the points P1, . . . , Pn below the straight route to the transport destination of the package 12. When the control unit 21 determines the position Qj above the given point Pj as the avoidance point in particular, the control unit 21 may determine depending on the state of the point Pk whether or not to include the point Pk as a new passing point in the route avoiding the avoidance point.

As still another modification of the present embodiment, when the flying object 30 has no choice but to pass the point where any person or vehicle is present and no shielding object is present, the control unit 21 of the controller 20 may determine to include the point in the flight route 11.

The present disclosure is not limited to the embodiment disclosed. For example, two or more blocks described in the block diagrams may be combined, or one block may be divided into a plurality of blocks. Instead of chronologically executing two or more steps stated in the flowchart in accordance with the description, the steps may be executed in parallel or in different order in accordance with the performance of the devices that execute the respective steps or in accordance with the need. Further modifications are possible without departing from the scope of the present disclosure.

For example, the controller 20 may be provided in the flying object 30. In that case, some of the operations of the flying object 30 may be performed by the controller 20. When the control unit 31, the storage unit 32, the communication unit 33, the input unit 34, the output unit 35, and the positioning unit 36 of the flying object 30 are built in a control device, the control device may be integrated into the controller 20.

What is claimed is:

1. A controller comprising:
a control unit being configured to:
detect a state of at least one point, the state of at least one point is a first state or a second state, the first state of the at least one point is when any person or any vehicle is present and no shielding object is present and the second state is where no person or no vehicle is present or where a shielding object that shields a ground is present at the at least one point; and
determine depending on the detected state whether or not to include, in a flight route of a flying object transporting a package, a position above the at least one point as a passing point for the flying object to pass, and
determine not to include a position above a point where any person or any vehicle is present and the shielding object is not present in the flight route,
detect the state of the at least one point by analyzing a ground image taken from the flying object, the ground image including a transport destination of the package to determine whether or not any shielding object that shields the ground is present at the at least one point in the flight route based on an image analysis,
identify from the ground image whether the shielding object that shields the ground is present at the at least one point in the flight route is a roof, and
in response to identifying that the shielding object is the roof from the ground image, determine that the at least one point that includes the roof is in the flight route of the flying object transporting the package, the at least one point that includes the roof in the flight route of the flying object transporting the package is in the second state,
wherein: when the state of the at least one point is the first state determine not to include the position above the at least one point in the flight route and control the flying object in the flight route to not include the at least one point when in the first state;
when the state of the at least one point is the second state, determine to include the position above the at least one point in the flight route and control the flying object in the flight route to include the at least one point when in the second state; and
when a state of a point below a remaining route of the flight route changes to the first state while the flying object flies along the flight route, control the flying object to wait until the state of the point below the remaining route changes to the second state.

2. The controller according to claim 1, wherein:
the control unit is configured to detect as the state of the at least one point a state of a point below a straight route to a transport destination of the package; and when a position above a given point is determined as an avoidance point that is not included in the flight route, the control unit is configured to determine the flight route by changing the straight route to a route that avoids the avoidance point.

3. The controller according to claim 1, wherein:
when the flying object flies along the flight route, the control unit is configured to detect as the state of the at least one point a state of a point below a remaining route of the flight route; and
when a position above a given point is determined as an avoidance point that is not included in the flight route, the control unit is configured to correct the flight route by changing the remaining route to a route that avoids the avoidance point.

4. The controller according to claim 1,
wherein the control unit is configured to predict a state of a transport destination of the package, and adjust a flight schedule of the flying object in accordance with the predicted state.

5. The controller according to claim 4,
wherein the state of the transport destination of the package includes whether or not any person is present at the transport destination of the package.

6. The controller according to claim 5,
wherein the control unit is configured to predict the state of the transport destination of the package by detecting a sign of movement of any person to the transport destination of the package.

7. The controller according to claim 5,
wherein the control unit is configured to predict the state of the transport destination of the package based on an operation schedule of a collection vehicle that collects an article from the transport destination of the package.

8. The controller according to claim 4,
wherein the state of the transport destination of the package includes whether or not any vehicle is present at the transport destination of the package.

9. The controller according to claim 8,
wherein the control unit is configured to predict the state of the transport destination of the package in accordance with a position of a vehicle heading for the transport destination of the package.

10. A system, comprising: the controller according to claim 1; and
the flying object configured to fly along the flight route to transport the package.

11. The flying object,
comprising the controller according to claim 1, wherein the flying object is configured to fly along the flight route to transport the package.

12. A flying object that transports a package comprising:
a communication unit configured to receive route data indicating a flight route from a controller, the controller being configured to:
determine depending on a state of at least one point whether or not to include in the flight route of the flying object a position above the at least one point as a passing point for the flying object to pass, the state of at least one point is a first state or a second state, the first state of the at least one point is when any person or any vehicle is present and no shielding object is present and the second state is where no person or no vehicle is present or where a shielding object that shields a ground is present at the at least one point;

determine not to include a position above a point where any person or any vehicle is present and the shielding object is not present in the flight route;
detect the state of the at least one point by analyzing a ground image taken from the flying object, the ground image including a transport destination of the package to determine whether or not any shielding object that shields the ground is present at the at least one point in the flight route based on an image analysis;
identify from the ground image whether the shielding object that shields the ground is present at the at least one point in the flight route is a roof,
in response to identifying that the shielding object is the roof from the ground image, determine that the at least one point that includes the roof is in the flight route of the flying object transporting the package, the at least one point that includes the roof in the flight route of the flying object transporting the package is in the second state; and
a control unit configured to control flight of the flying object based on the route data received by the communication unit,
wherein, the controller having a control unit configured to:
when the state of the at least one point is the first state, determine not to include the position above the at least one point in the flight route and control the flying object in the flight route to not include the at least one point when in the first state;
when the state of the at least one point is the second state, determine to include the position above the at least one point in the flight route and control the flying object in the flight route to include the at least one point when in the second state; and
when a state of a point below a remaining route of the flight route changes to the first state while the flying object flies along the flight route, control the flying object to wait until the state of the point below the remaining route changes to the second state.

13. The flying object according to claim 12, wherein the control unit is configured to control the flying object to fly horizontally to a transport destination of the package, and control the flying object to vertically descend from above the transport destination of the package.

14. A transport method comprising:
detecting a state of at least one point by a controller, the state of the at least one point is a first state or a second state, the first state of the at least one point is when any person or any vehicle is present and no shielding object is present and the second state is where no person or no vehicle is present or where a shielding object that shields a ground is present at the at least one point;
detecting the state of the at least one point by analyzing a ground image taken from a flying object, the ground image including a transport destination of a package to determine whether or not any shielding object that shields the ground is present at the at least one point in a flight route based on an image analysis;
identifying from the ground image whether the shielding object that shields the ground is present at the at least one point in the flight route is a roof,
in response to identifying that the shielding object is the roof from the ground image, determining that the at least one point that includes the roof is in the flight route of the flying object transporting the package, the at least one point that includes the roof in the flight route of the flying object transporting the package is in the second state;
determining depending on the detected state whether or not to include in the flight route of the flying object a position above the at least one point as a passing point for the flying object to pass by the controller;
determining not to include a position above a point where any person or any vehicle is present and the shielding object is not present in the flight route, and
transporting the package along the flight route by the flying object,
wherein the controller including a control unit configured to:
when the state of the at least one point is a first state, determine not to include the position above the at least one point in the flight route and control the flying object in the flight route to not include the at least one point when in the first state;
when the state of the at least one point is the second state, determine to include the position above the at least one point in the flight route and control the flying object in the flight route to include the at least one point when in the second state; and
when a state of a point below a remaining route of the flight route changes to the first state while the flying object flies along the flight route, control the flying object to wait until the state of the point below the remaining route changes to the second state.

* * * * *